United States Patent Office 3,285,889
Patented Nov. 15, 1966

3,285,889
POLYMERS OF 1-MONOOLEFINS AND
DODECATETRAENES
Philip M. Arnold, Bartlesville, Okla., assignor to Phillips Petroleum Company, a corporation of Delaware
No Drawing. Filed Sept. 16, 1963, Ser. No. 309,304
3 Claims. (Cl. 260—80.5)

This invention relates to a process for copolymerizing 1-monoolefins with a monomer which imparts unsaturation to the resulting polymer, and to the polymers so produced. In another aspect, it relates to a process for copolymerizing ethylene, at least one other 1-monoolefin such as propylene, and a monomer which imparts unsaturation to the resulting polymer and renders the same sulfur-vulcanizable. In another aspect, it relates to novel copolymers of 1-monoolefins and monomers which impart unsaturation to the copolymers.

Many 1-monoolefins, such as ethylene and propylene, are inexpensive polymerizable monomers which are commercially available in great volumes. Such monomers can be polymerized to form polymers ranging from low molecular weight oils to high molecular weight solids. The curing or vulcanization of many of these polymers cannot be conveniently carried out in the conventional manner, for example by vulcanization with sulfur as in the case of butadiene/styrene polymers, because of the lack of ethylenic unsaturation in the polymer. Vulcanization of these polymers, such as an ethylene/propylene copolymer, requires the use of expensive high energy radiation or organic peroxides, or requires pretreatment such as chlorosulfonation or chlorination of the polymer in order to render it suitable for curing. Such process limitations detract from the gains to be had by the unique properties possessed by the polymers, especially ethylene/propylene copolymers which are high molecular weight rubber-like substances having a high degree of resistance to weathering, sunlight and ozone.

A number of processes have been proposed for chemically modifying polymers of 1-monoolefins, particularly ethylene/propylene copolymers, in order to impart some degree of unsaturation to the copolymers and make it possible to cure them with sulfur. Such modifications can be achieved by incorporating a different copolymerizable monomer, but in general such modifications have not produced the polymer in good yields and have, for example in the case of a dicyclopentadiene, required large amounts of the additional monomer to impart sufficient unsaturation and long periods for the polymer to cure.

Accordingly, an object to this invention is to provide an improved process for the polymerization of 1-monoolefins. Another object is to provide improved polymers of 1-monoolefins, which polymers can be cured with sulfur. Another object is to provide an improved process for chemically modifying an ethylene/propylene polymer so as to impart some degree of unsaturation thereto and make it amenable to vulcanization with sulfur. Further objects and advantages of this invention will become aparent to those skilled in the art from the following description and accompanying claims.

Briefly, the improved process of this invention comprises copolymerizing ethylene, or ethylene and at least one other 1-monoolefin such as propylene, with a polydiene monomer selected from the group consisting of linear octatrienes and linear dodecatetraenes, and recovering the resulting novel polymer from the polymerization reaction mixture. Such polymerization can be carried out with any polymerization coordination catalyst known in the art, which catalyst generally comprises that obtained upon commingling a reducible metal compound, such as vanadium tetrachloride or vanadium oxytrichloride, with a reducing compound of a metal, usually aluminum, such as ethylaluminum sesquichloride. The novel polymers produced by this invention have some degree of unsaturation and can range from crystalline or plastic materials to elastomeric materials, and they can be vulcanized with sulfur to produce polymeric products which have useful properties that make them widely applicable.

The linear octatrienes or dodecatetraenes, which are employed in this invention in the polymerization of 1-monoolefins, are liquids and are known in the art. Representative octatrienes and dodecatetraenes which can be so employed as comonomers in this invention include:

1,3,7-octatriene,
1,3,5-octatriene,
1,3,6-octatriene,
1,4,6-octatriene,
1,4,7-octatriene,
1,3,7,11-dodecatetraene,
1,3,6,11-dodecatetraene,
1,3,7,10-dodecatetraene,
1,3,5,7-dodecatetraene,
1,3,5,8-dodecatetraene,
1,3,5,9-dodecatetraene,
1,3,5,10-dodecatetraene,
1,3,5,11-dodecatetraene,
1,3,6,8-dodecatetraene,
1,3,6,9-dodecatetraene,
1,3,6,10-dodecatetraene,
1,3,7,10-dodecatetraene,
1,3,7,9-dodecatetraene,
1,3,8,10-dodecatetraene,
1,3,8,11-dodecatetraene,
1,3,9,11-dodecatetraene,
1,4,6,8-dodecatetraene,
1,4,6,9-dodecatetraene,
1,4,6,10-dodecatetraene,
1,4,6,11-dodecatetraene,
1,5,7,9-dodecatetraene,
1,5,7,10-dodecatetraene,
1,5,7,11-dodecatetraene,
1,6,8,10-dodecatetraene, and the like, including mixtures thereof. Two comonomers of this class which have been found useful in the practice of this invention are a 1,3,7-octatriene identified as USI product 637–73A and a mixture of dodectetraenes identified as USI product 800–148A, both supplied by U.S. Industrial Chemicals Company. The octatrienes can be made by dimerization of butadiene, and the dodecatetraenes by trimerization of butadiene.

The 1-monoolefins which can be copolymerized with ethylene and any one of the above-mentioned octatrienes and dodecatetraenes can be represented by the general formula $CH_2=CHR$, where R is an alkyl radical having 1 to 6 carbon atoms. Representative 1-monoolefins which can be used as comonomers include propylene 1-butene, 1-pentene, 1-hexene, 1-octene, 3-methyl-1-pentene, 3-methyl-1-hexene, 4-ethyl-1-hexene, 4,4-dimethyl-1-pentene, 3,3-dimethyl-1-butene, 5-methyl-1-hexene, 4-methyl-1-heptene, 5-methyl-1-heptene, 4,4-dimethyl-1-hexene, 6-methyl-1-heptene, 3,4,4-trimethyl-1-pentene, and the like, including mixtures of two, three or more thereof.

The relative percentages of the polymers of this invention attributable to each of the 1-monoolefin monomers and the polydiene comonomer can vary widely, with the minimum amount of the polydiene comonomer being that sufficient to impart sulfur-curability to the polymer. Generally, the polydiene comonomer will make up from 0.5 to 20 weight percent, preferably 1 to 10 weight percent, of the polymer. Where ethylene is the sole 1-monoolefin employed with the polydiene comonomer, the former will usually make up from 80 to 99.5 weight percent of the polymer. In the case where the polydiene comonomer is copolymerized with ethylene and one or more additional 1-monoolefins, the polymer will comprise 20 to 75 weight percent ethylene, 20 to 75 weight percent of the additional 1-monoolefins, and 0.5 to 20 weight percent of the polydiene comonomer, and preferably with the total weight percent of the additional 1-monoolefins being at least 20 weight percent of the polymer and not exceeding 15 weight percent of the polydiene in the polymer.

Any of the polymerization coordination catalysts known in the prior art can be employed in the polymerization process of this invention, such catalysts comprising (1) at least one compound of a reducible polyvalent transition metal of Groups IVA, VA, VIA, VIIA, VIII of the Periodic Table (e.g., titanium, vanadium, chromium, manganese, iron, cobalt, and nickel), said reducible compound being a halide, oxyhalide, alcoholate or acetylacetonate and (2) at least one reducing compound of a metal of Groups I, II, III, IVB and VB of the Periodic Table (e.g., lithium, sodium, potassium, rubidium, cesium, beryllium, magnesium, calcium, strontium, barium, copper, zinc, cadmium, mercury, aluminum, tin, and antimony), which is referably above hydrogen in the electromotive series, said reducing compound being an organometal compound, a metal hydride, an organometal hydride or an organometal halogen compound. (The Periodic Table referred to herein and in the claims is shown on pages 448–449 of the Handbook of Chemistry and Physics, 34th edition, published by Chemical Rubber Publishing Co., Cleveland, Ohio.) Preferably, the metal of the reducible compound is vanadium, titanium or chromium, with vanadium trichloride, vanadium tetrachloride, vanadium oxytrichloride, vanadium oxydichloride, vanadium acetylacetonate, vanadyl acetylacetonate, titanium tetrachloride, tetrabutyl titanate, tetraisopropyl titanate, chromic chloride, chromium acetylacetonate, and chromyl acetylacetonate being examples of preferred reducible components of the coordination catalyst. Preferably, the reducing compound has the general formula $R_nMX_m$ where R is a saturated aliphatic, saturated cycloaliphatic, or aromatic hydrocarbon radical having from 1 to 20 carbon atoms, M is a metal selected from the group consisting of lithium, sodium, potassium, magnesium, calcium, zinc, mercury, aluminum, and tin, X is a halogen selected from the group consisting of chlorine, bromine, and iodine, $n$ is a number from 1 to 4, $m$ is a number from 0 to 2, and $n+m$ is equal to the valence of metal M. The mole ratio of the reducing compound to the reducible compound in the catalyst system can vary widely, and generally this ratio will be in the range of 1/1 to 20/1. The total catalyst level in the reaction system can also vary widely, and generally will be 0.001 to 10 percent by weight of the total monomers, or as expressed in terms of the amount of reducible compound, the catalyst level can be in the range of 0.25 to 40 millimoles (mmoles.) per 100 grams of the total monoolefin charged to the reaction system. The catalyst can be premixed, i.e., the catalyst components can be admixed prior to charging to the reaction system, or the catalyst can be prepared in situ in the reaction system. These components or the premixed catalyst can be charged to the reaction system as solutions in solvents like those employed as reaction diluents for the monomers and polymer.

Representative reducible transition metal compounds which can be used in making up the coordination catalysts used in preparing the polymers of this invention include: titanium tetrachloride, titanium tetrabromide, titanium oxydichloride, tetraisopropyl titanate, titanium trichloride, tetra-n-butyl titanate, tetra-2-ethylbutyl titanate, vanadium trichloride, vanadium tetrachloride, vanadium oxyrichloride, vanadium acetylacetonate, vanadyl acetylacetonate, tetra-n-butyl vanadate, tetraethyl vanadate, trimethyl orthovanadate, vanadium oxydichloride, vanadium dichloride, 2-ethylhexyl vanadate, vanadium dibromide, vanadium pentoxide, chromyl chloride, chromium acetylacetonate, chromyl acetylacetonate, chromium chloride, cobaltous chloride, manganese bromide, cuprous chloride, ferric bromide, molybdenum chloride, nickel chloride, and the like, including mixtures thereof.

Representative reducing compounds which can be commingled with any one of the above-named transition metal compounds to prepare the coordination catalyst used in this invention include: ethylaluminum sesquichloride, ethylaluminum sesquiiodide, n-butylaluminum sesquibromide, isopropylaluminum sesquichloride, n-hexylaluminum sesquichloride, n-decylaluminum sesquiiodide, trihexylaluminum, triethylaluminum, diethylaluminum chloride, ethylaluminum dichloride, diisobutylaluminum butoxide, triisobutylaluminum, aluminum hydride, isobutylaluminum dichloride, isobutylaluminum dibutoxide, n-butylaluminum dichloride, n-butyllithium, sodium naphthalene, diisobutylzinc, lithium aluminum tetra-n-decyl, lithium aluminum tetra-n-octyl, amylpotassium, tetraphenyltin, diethyltin diiodide, n-butylmagnesium bromide, diphenylcalcium, di-tert-butylzinc, diethylmercury, and the like, including mixtures thereof.

Representative of the coordination catalysts which can be used in this invention are those obtained upon commingling vanadium tetrachloride and ethylaluminum sesquichloride, vanadium trichloride and ethylaluminum sesquibromide, vanadium oxytrichloride and n-butylaluminum sesquibromide, vanadium oxydichloride and isopropylaluminum sesquichloride, vanadium acetylacetone and n-hexylaluminum sesquichloride, vanadium oxydichloride and diisobutylaluminum butoxide, vanadium oxytrichloride and triisobutylaluminum, vanadium oxytrichloride and aluminum hydride, vanadium dichloride and triisobutylaluminum, vanadium trichloride and isobutylaluminum dichloride, vanadium tetrachloride and isobutylaluminum dibutoxide, vanadium tetrachloride and triisobutylaluminum, vanadium tetrachloride and aluminum hydride, 2-ethylhexyl vanadate and triisobutylaluminum, titanyl dichloride and isobutylaluminum dichloride, titanium tetrachloride and isobutylaluminum dichloride, titanium tetrachloride and lithium aluminum didodecyldichloride, titanium tetrachloride and n-decylaluminum sesquiiodide, titanium tetrachloride and sodium naphthalene, tetraisopropyl titanate and triisobutylaluminium, tetraisopropyl titanate and sodium naphthalene, cobaltous chloride and triisobutylaluminum, cobalt bromide or chloride and triisobutylaluminum, manganese bromide and triisobutylaluminum, manganese bromide and diisobutylzinc, chromium chloride and triisobutylaluminum, chromium acetylacetonate and n-heptylaluminimum sesquichloride, cuprous chloride and triisobutylaluminum, ferric bromide and triisobutylaluminum, molybdenum chloride and triisobutylaluminum, nickel chloride and triisobutylaluminum, vanadium oxytrichloride and diethylaluminum chloride, vanadium tetrachloride and ethylaluminum dichloride, vanadium oxydiacetylacetonate and triethylaluminum, trimethyl orthovanadate and trihexylaluminum, vanadium tetrachloride and trihexylaluminum, vanadium oxytrichloride and butyllithium, vanadium triacetylacetonate and diethylaluminum chloride, titanium tetrachloride and trihexylaluminum, vanadium trichloride and trihexylaluminum, titanium trichloride and trihexylaluminum titanium dichloride and trihexylaluminum, vanadium trichloride and n-butyllithium, vanadium tetrachloride and amylpotassium, vanadium oxytrichloride and sodium naphthalene, vanadium oxydichloride and diethylmagnesium, vanadium acetylacetonate and butylmagnesium bromide, vanadyl acetylacetonate and diphenyl-calcium, chromic chloride and di-tert-butylzinc, chromium acetylacetonate and diethylmercury, chromyl acetylacetonate and tetraphenyltin, titanium tetrachloride and diethyltin diiodide, tetra-n-butyl titanate and diethylmagnesium, and the like.

The polymerization reaction of this invention is carried out in the absence of materials which have a deleterious effect on the catalyst (such as oxygen, carbon dioxide and water) and in a liquid phase system using a solvent, which will usually be a hydrocarbon or a halogenated hydrocarbon, such as propane, butane, pentane, hexane, benzene, toluene, xylene, tetrachlorethylene, cyclohexane, methylcyclohexane, chlorobenzene, o-dichlorobenzene, dichloromethane, 1,1,2,2-tetrachloroethane, and the like. The polymer will be soluble in the solvent and usually will be present in a concentration of 1 to 15 weight percent. The polymerization conditions can vary widely, but generally the polymerization temperature will be in the range of −80 to 150° C. and the reaction pressure will be that sufficient to maintain the reaction mixture in the liquid phase and can be up to 500 or more atmospheres. Polymerization can be carried out in a batch manner or a continuous fashion, much like the polymerization processes of the prior art. Following polymerization, the polymer product can be conventionally recovered from the effluent by coagulation with a non-solvent such as an alcohol like isopropyl alcohol or n-butyl alcohol, acetone, or the polymer can be recovered by stripping the solvent with heat or steam. An antioxidant can be incorporated in the polymer during the recovery procedure, such as phenyl-beta-naphthylamine, di‐tert‐butylhydroquinone, triphenylphosphite, heptylated diphenylamine, 2,2′-methylene-bis(4-methyl-6-tert-butylphenyl), and 2,2,4-trimethyl-6-phenyl-1,2-dihydroquinoline.

The vulcanization or curing of the novel polymers of this invention can be carried out using conventional sulfur vulcanization procedures (e.g., 250–400° F., for 5–120 minutes), the amount of sulfur employed generally being from 0.1 to 5 parts per 100 parts of polymer (phr.), and usually about 0.5 to 3 phr. The polymers can also be cured with compounds which can decompose to form free radicals such as peroxides (e.g., 0.1 to 10 ph.) like diisopropyl peroxide, di-tert-butyl peroxide, dibenzolyl peroxide, tert.-butyl perbenzoate, etc. The polymers can also be cured with combinations of peroxide and sulfur, e.g., with peroxide/sulfur weight ratio of 0.1/1 to 4/1. Vulcanization accelerators, accelerator activators, reinforcing agents, extenders, plasticizers, antioxidants and fillers, like those agents used in compounding natural and synthetic rubber, can also be employed. Fillers and reinforcing agents such as carbon black, clay, calcium silicate, talc, silica, whiting, and titanium dioxide, and plasticizers such as naphthenic and paraffinic oils, can be used in compounding the polymers of this invention.

Such polymers will have molecular weights in the range of about 5000 to 1,000,000, and can be used in fabricating such rubber goods and plastic products as coatings for electrical cables, window-seals, garden hose, soles and heels, belts, coated fabrics, tires, films, coatings, containers (e.g., bottles), pipes, fibers, etc.

The objects and advantages of this invention are illustrated in the following examples, but it should be understood that the various materials used in these examples, the conditions of operation, and other details, should not be construed to unduly limit this invention.

Example I

Ethylene/propylene/dodecatetraene copolymers were prepared in a series of five runs employing toluene or cyclohexane as reaction diluent and using as a polymerization coordination catalyst ethylaluminum sesquichloride (EASC) commingled with either vanadium tetrachloride $VCl_4$ or vanadium oxytrichloride $VOCl_3$. In each run, a 3/1 volume mixture of propylene and ethylene was prepared by charging propylene to an evacuated bomb until the pressure reached 30 p.s.i.g. and then charging ethylene until the total pressure was 45 p.s.i.g. The diluent (100 ml.) was charged first to the reactor which was then purged with nitrogen. The dodecatetraene was then added to the reactor, followed by the ethylaluminum sesquichloride. The ethylene/propylene mixture was then introduced from the bomb reservoir, raising the pressure in the polymerization reactor to about 45 p.s.i.g. Charging of the reactor was done at room temperature. The polymerization reaction mixture was agitated for 5 min., after which polymerization was initiated by introducing the vanadium component of the catalyst. Then additional ethylene/propylene mixture was passed to the reactor from its reservoir to maintain a constant pressure as polymerization continued. The temperature of polymerization increased due to the exothermic reaction. Table I sets forth charge materials used in the runs. The dodecatetraene used in these runs was a commercially available mixture of dodecatetraenes, namely USI product 800–148A, redistilled at 80–100° C. at 8 mm. Hg.

TABLE I

| Run | Diluent | EASC, mmoles | VCl₄ mmoles | VOCl₃, mmoles | Dodecatetraene, gms. |
| --- | --- | --- | --- | --- | --- |
| 1 | Toluene | 0.25 | 0.1 | 0 | 2.5 |
| 2 | do | 0.25 | 0.1 | 0 | 5.0 |
| 3 | Cyclohexane | 0.25 | 0.1 | 0 | 2.5 |
| 4 | Toluene | 0.25 | 0 | 0.1 | 2.5 |
| 5 | Cyclohexane | 0.25 | 0 | 0.1 | 2.5 |

After a 30-min. polymerization period, the reaction of each run was terminated (shortstopped) with an isopropyl alcohol solution of 2,2′-methylene-bis(4-methyl-6-tert-butyphenol) antioxidant, the amount of antioxidant used being 1 phr. The ethylene/propylene/dodecatetraene polymer was coagulated in isopropyl alcohol, separated and dried. Certain properties of the polymers from the runs were determined and these are set forth in Table II, along with the amounts of polymer products recovered. The numbers of the "polymer sample" in Table II correspond to the numbers of the "run" of Table I.

TABLE II

| Polymer sample | Amt. of polymer, gms. | Total unsaturation | | Propylene, wt. percent | Inherent viscosity | Toluene insolubles, wt. percent |
| --- | --- | --- | --- | --- | --- | --- |
| | | Mmoles ICl per gm. polymer | Wt. percent as C₂H₄ | | | |
| 1 | 1.9 | 0.17 | 0.476 | 31 | 1.18 | 28 |
| 2 | 1.1 | 0.13 | 0.364 | | 1.02 | 47 |
| 3 | 1.1 | 0.11 | 0.308 | | 1.32 | 36 |
| 4 | 2.4 | 0.18 | 0.504 | 42 | 1.02 | 17 |
| 5 | 1.9 | 0.23 | 0.644 | | 1.14 | 36 |

The dodecatetraene comonomer was incorporated in the polymer products as evidenced by the unsaturation data in Table II.

Example II

Copolymers of ethylene/propylene/1,3,7-octatriene were prepared in a series of three runs, using the procedure described in Example I. In these runs, the 1,3,7-octatriene used was USI product 637–73A, redistilled at 55–57° C. at 64 mm. Hg. Table III sets forth charged materials used in the runs, and Table IV sets forth the amount of polymer products obtained and certain properties thereof, the number of the "polymer sample" in the latter table corresponding to the number of the "run" in Table III.

TABLE III

| Run | Diluent | EASC, mmoles | VCl₄ | Octadiene |
|---|---|---|---|---|
| 1 | Toluene | 0.25 | 0.1 | 2.5 |
| 2 | do | 0.25 | 0.1 | 5.0 |
| 3 | do | 0.25 | 0.2 | 2.5 |

TABLE IV

| Polymer sample | Amt. of polymer, gms. | Total unsaturation | | Propylene, wt. percent | Inherent viscosity | Toluene insolubles, wt. percent |
|---|---|---|---|---|---|---|
| | | Mmoles ICl per gm. | Wt. percent as C₂H₄ | | | |
| 1 | 0.7 | 0.19 | 0.532 | | 1.16 | 38 |
| 2 | 0.4 | | | | | |
| 3 | 1.5 | 0.34 | 0.952 | 31 | 1.03 | 28 |

The octatriene was incorporated in the polymer products as evidenced by the unsaturation data of Table IV.

In the foregoing examples, the procedure used to determine total unsaturation by iodine chloride titration was as follows: A 0.5-gram sample of polymer was dissolved in a 75/25 volume mixture of carbon disulfide and chloroform, a chloroform solution of iodine chloride of known concentration (approximately 0.09–0.10 molar) was added, the mixture was placed in a 25° C. bath for one hour to allow time for reaction, and the excess of iodine chloride was titrated with 0.05 N sodium thiosulfate. The millimoles of iodine chloride that reacted with one gram of sample was then calculated. A blank was run using only solvent and iodine chloride and appropriate correction was made when calculating unsaturation. In expressing total unsaturation as weight percent ethylene, the millimoles of ICl per gram of polymer was multiplied by the millimole weight of ethylene (i.e., 0.028) and converted to percent by multiplying the product by 100.

In the examples, an infrared procedure was used to determine the wt. percent propylene. A carbon tetrachloride solution of the polymer containing one gram of polymer per 100 milliliters solvent was used. The solution was placed in a 1500-micron cell and scanned for a peak at the 7.25 micron band using a commercial infrared spectrophotometer. The number of methyl groups (N) was obtained from the formula:

$$N = \frac{(14{,}000)(A_{7.25})(1{,}000)}{(C)(t)(\epsilon)} \quad \text{(I)}$$

14,000 = molecular weight of 1,000 methylene groups
$A_{7.25}$ = absorbance at the 7.25 micron band
$C$ = concentration of polymer solution in gram/liter
$t$ = cell thickness in centimeters
$\epsilon$ = specific extinction coefficient The specific extinction coefficient ($\epsilon = 28{,}700$) was determined using three samples of an ethylene/propylene copolymer of known propylene content as a reference material. The value was obtained by solving the equation $$\epsilon = \frac{(14{,}000)(A_{7.25})}{(d)(t)(N)} \quad \text{(II)}$$

$d$ = density of polymer solution in gm./cc. (assumed to 0.9)
$t$ = thickness of absorbing layer of polymer in centimeters
$N$ = number of methyl branches in control polymer The percent propylene was calculated as follows:

$$\text{Percent} = \frac{(N)(100)}{333} \quad \text{(III)}$$

In the Formula III, 333 is the number of methyl branches per 1,000 methylene groups.

The inherent viscosities referred to in the examples were determined by placing one tenth gram of polymer in a wire cage made from 80 mesh screen and placing the wire cage in 100 ml. of toluene contained in a widemouth, 4-ounce bottle. After standing at room temperature (approximately 25° C.) for 24 hours, the cage was removed and the solution was filtered through a sulfur absorption tube of grade C porosity to remove any solid particles present. The resulting solution was run through a medalia-type viscometer supported in a 25° C. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the soluble portion of the original sample.

The amount of toluene isolubles referred to in the examples is that amount of material not dissolved after 0.2 gram sample of the polymer remains in contact with 100 milliliters of toluene at room temperature for 24 hours. The value should be below 50 weight percent for a rubbery polymer. Ordinarily, it is preferred to have the value below 25 weight percent, but for some uses (mechanical goods, mats, shoe soles, etc.) it can be higher. For uses where high resilience and low heat build-up are important, it is desirable to have the toluene insolubles low.

Various modifications and alterations of this invention will become apparent without departing from the scope and spirit of this invention and it should be understood that this invention is not to be limited unduly to that set forth herein for illustrative purposes.

I claim:
1. A copolymer composition consisting essentially of 80 to 99.5 weight percent of ethylene and 0.5 to 20 weight percent of dodecatetraene.

2. A rubbery terpolymer composition consisting essentially of 20 to 75 weight percent ethylene, 20 to 75 weight percent propylene and 0.5 to 20 weight percent of dodecatetraene.

3. In a process for forming rubbery polymer compositions, said compositions being selected from the group consisting of a copolymer consisting essentially of 80 to 99.5 weight percent of ethylene and 0.5 to 20 weight percent of dodecatetraene, and terpolymers consisting essentially of 20 to 75 weight percent ethylene, 20 to 75 weight percent of a 1-monoolefin having the formula

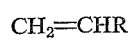

$$CH_2 = CHR$$

wherein R is selected from the group consisting of an alkyl having 1 to 6 carbon atoms and 0.5 to 20 weight percent of dodecatetraene, said process comprising the steps of polymerizing a monomer selected from the group consisting of ethylene and mixtures of ethylene and at least one of said 1-monoolefins in the presence of a coordination catalyst obtained upon commingling ethylaluminum sesquichloride with a component selected from the group consisting of vanadium tetrachloride and vanadium oxytrichloride, at a temperature ranging from −80 to 150° C. and a pressure ranging from 1 to 500 atmospheres, in the presence of either a toluene or cyclohexane diluent; incorporating into the polymerization system dodecatetraene in an amount as stated hereinabove to make the resulting copolymer or terpolymer amenable to vulcanization with sulfur and recovering the copolymer or terpolymer from the polymerization system.

References Cited by the Examiner

UNITED STATES PATENTS

| | | | |
|---|---|---|---|
| 2,933,480 | 4/1960 | Gresham et al. | 260—80.5 |
| 2,962,490 | 11/1960 | Edmonds et al. | 260—88.2 |
| 3,058,963 | 10/1962 | Vandenberg | 260—93.7 |

JOSEPH L. SCHOFER, *Primary Examiner.*

W. HOOVER, *Assistant Examiner.*